United States Patent [19]

Drescher et al.

[11] 3,810,577

[45] May 14, 1974

[54] ERROR TESTING AND ERROR LOCALIZATION IN A MODULAR DATA PROCESSING SYSTEM

[75] Inventors: Heinz Drescher, Schoenaich; Hans Hermann Lampe, Oberjesingen; Peter Rudolph, Schoenaich, all of Germany; Franco Simonini, Vimercate, Italy

[73] Assignee: International Business Machines Corporation, Armonk, N.Y.

[22] Filed: Oct. 25, 1972

[21] Appl. No.: 300,635

[30] Foreign Application Priority Data

Nov. 25, 1971 Germany............................ 2158433

[52] U.S. Cl. ..................... 235/153 AC, 340/146.1 E

[51] Int. Cl. ........................................... G06f 11/04

[58] Field of Search............... 235/153 AC, 153 AK; 340/146.1 AG, 146.1 C, 146.1 E

[56] References Cited

UNITED STATES PATENTS 3,140,464 7/1964 Rakoczi et al. ........... 340/146.1 AG

FOREIGN PATENTS OR APPLICATIONS 1,927,549 12/1970 Germany...................... 235/153 AC

OTHER PUBLICATIONS

Audretsch, L. M., et al. "Turn-Around Fault Bypass in Single-Rail Loop Communication Network," in IBM Tech. Disc. Bull. 14(12): pp. 3617-3618, May 1972.

*Primary Examiner*—Malcolm A. Morrison
*Assistant Examiner*—R. Stephen Dildine, Jr.
*Attorney, Agent, or Firm*—Edward S. Gershuny

[57] ABSTRACT

In a modular data processing system wherein the individual processing units are linked with each other via a bus system and with a central control, a tester is provided in each processing unit. The tester includes a test reply information register, an address generator for generating the processing unit address, a compare circuit for comparing the address transferred from the control unit via the address bus and stored in the address register with the processing unit address, a pattern generator for terminating the address bus with a given bit pattern of correct parity, a parity check circuit for signalling parity errors on the address bus, and a parity circuit for generating the correct parity bit from the bit pattern on the data bus. The output bits of these parity circuits together with the generated processing unit address are fed to the test reply information register for transmission. The tester also includes a control circuit for controlling the transmission of the addresses, the data patterns, and the test reply information.

13 Claims, 3 Drawing Figures

PATENTED MAY 14 1974 3,810,577

SHEET 2 OF 2

ERROR TESTING AND ERROR LOCALIZATION IN A MODULAR DATA PROCESSING SYSTEM

INTRODUCTION

The invention relates to an arrangement and a method for error testing and error localization in a modular data processing system which includes a central control and wherein the individual processing units are linked with each other via a bus system.

To ensure that computed results are correct, it is essential for the individual processing units of an electronic data processing system to be continually tested. However, owing to their complexity it is becoming increasingly difficult to test and maintain modern data processing systems in the field at reasonable expenditure. Therefore, it is essential that each data processing system be provided with test and maintenance equipment by means of which errors can be localized and neutralized on the spot, even during operation.

As the tests necessary for this purpose require a certain amount of time, it is no longer possible to neglect the testing time aspect if the processing speeds of electronic data processsing systems are to be economical.

To improve the known testing technique, U.S. Pat. No. 3,659,273 for example, provides for the control units of the input/output devices of an electronic data processing system, which are connected via a bus system, to be tested during the operation of the processing system, utilizing its normally recurring processing gaps.

In spite of such improvements in the testing methods and arrangements, long error search times may result for limiting an error, particularly in the case of intermittent errors. Apart from this, the known methods and arrangements no longer meet the requirements of modern data processing systems with regard to the scope of the functions to be tested.

Therefore, it is an object of the present invention to remedy these disadvantages and in particular to provide a universally applicable test system which is not limited by the number of processing units connected.

In accordance with an aspect of the invention, in a modular data processing system wherein the individual processing units are linked with each other via a bus system and with a central control, a tester is provided in each processing unit. The tester includes a test reply information register, an address generator for generating the processing unit address, a compare circuit for comparing the address transferred from the control unit via the address bus and stored in the address register with the processing unit address, a pattern generator for terminating the address bus with a given bit pattern of correct parity, a parity check circuit for signalling parity errors on the address bus, and a parity circuit for generating the correct parity bit from the bit pattern on the data bus. The output bits of these parity circuits together with the generated processing unit address are fed to the test reply information register for transmission. The tester also includes a control circuit for controlling the transmission of the addresses, the data patterns, and the test reply information.

In operation, the control unit initially tests whether the data bus, serving as a test and message bus for testing the processing units and as a transmission bus for control information and sensed data, is free from errors. Then the individual processing units are successively addressed. They indicate that they are free from errors by signalling, in their reply information, their processing unit addresses to the control unit, each addressed processing unit, by further extending the reply information (filling the corresponding bit positions), indicating that the data bus and its circuits are free from errors. Finally, in the event of address errors on the address bus, the processing unit detecting the parity error transfers the reply information with the processing unit address and the corresponding parity error bit to the control unit for error analysis.

The test arrangement and the method for its operation in accordance with the invention has the advantage that its performance with respect to the kind of error test to be executed, which is fully automated, is extremely high. In addition, errors are readily localized, in particular intermittent errors in the system.

The foregoing and other objects, features and advantages of the invention will be apparent from the following more particular description of a preferred embodiment thereof, as illustrated in the accompanying drawings.

Figure 1:
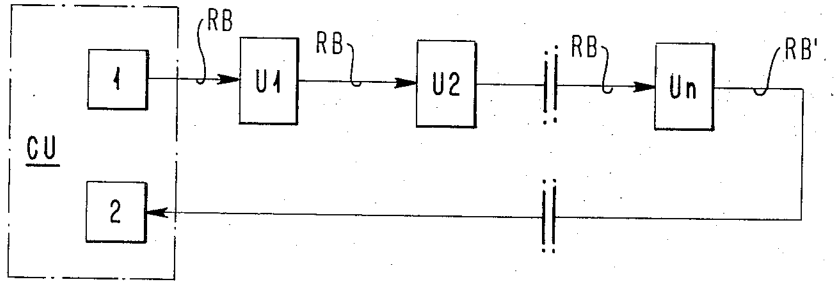
FIG. 1 is a block diagram of a modular electronic data processing system whose bus system is error-tested by means of an arrangement in accordance with the invention.

As is shown in the block diagram of FIG. 1, the modular electronic data processing system consists of a number of autonomously operating processing modules U1 to Un which are connected to each other via a ring bus system RB and RB', respectively, and to the superordinate control CU. These modular processing units U1 to Un may have an identical structure and may merely differ from each other by the microprograms stored in them which serve to implement different functions. The superordinate control CU is used to control common functions, such as, for example, to load the respective microprogram or the customer program, to carry out error diagnosis, and to control the priority of access to main storage which may be included in unit CU.

Figure 2:
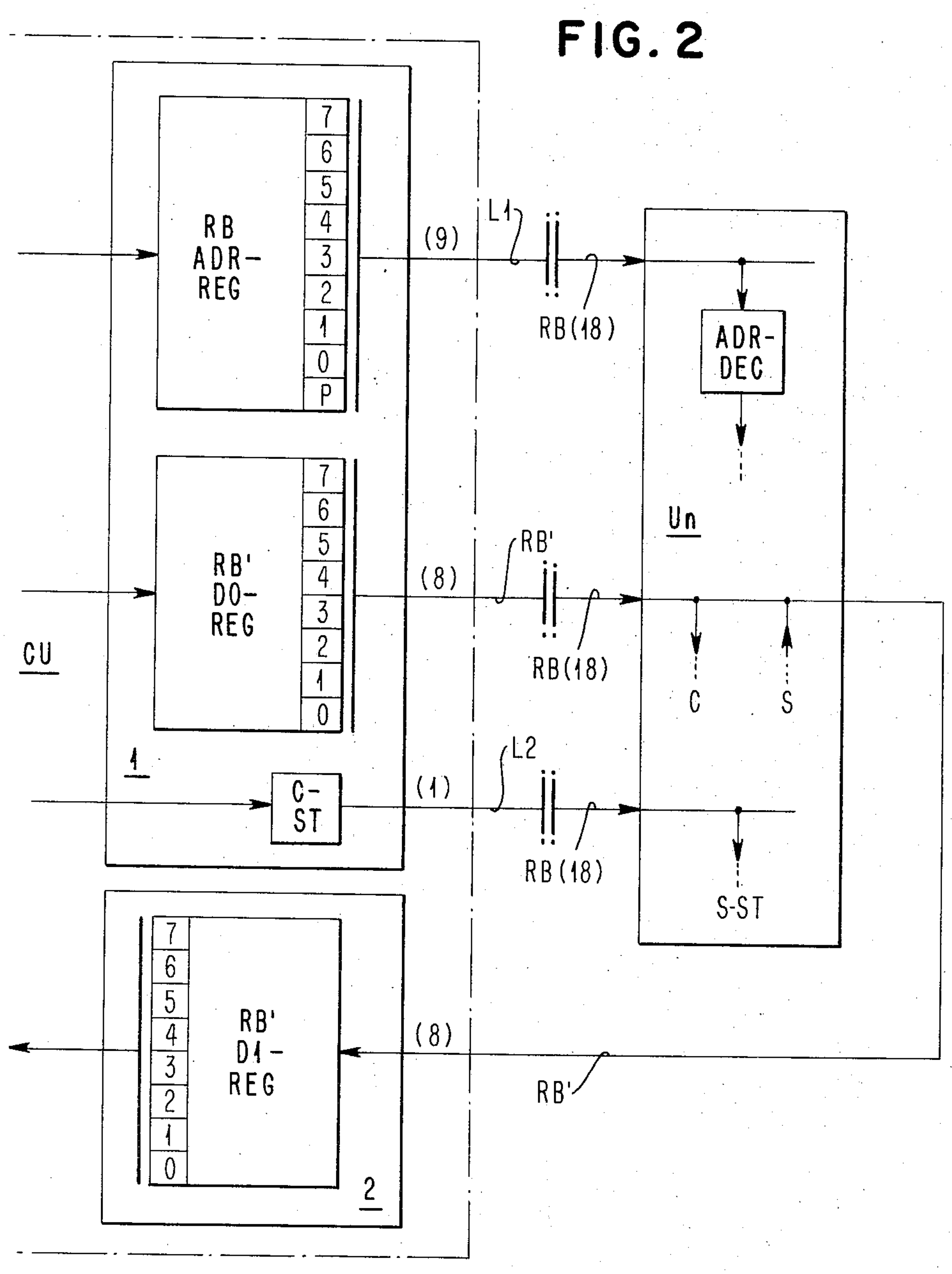
FIG. 2 is a more detailed block diagram of the test arrangement in accordance with the invention.
Figure 3:
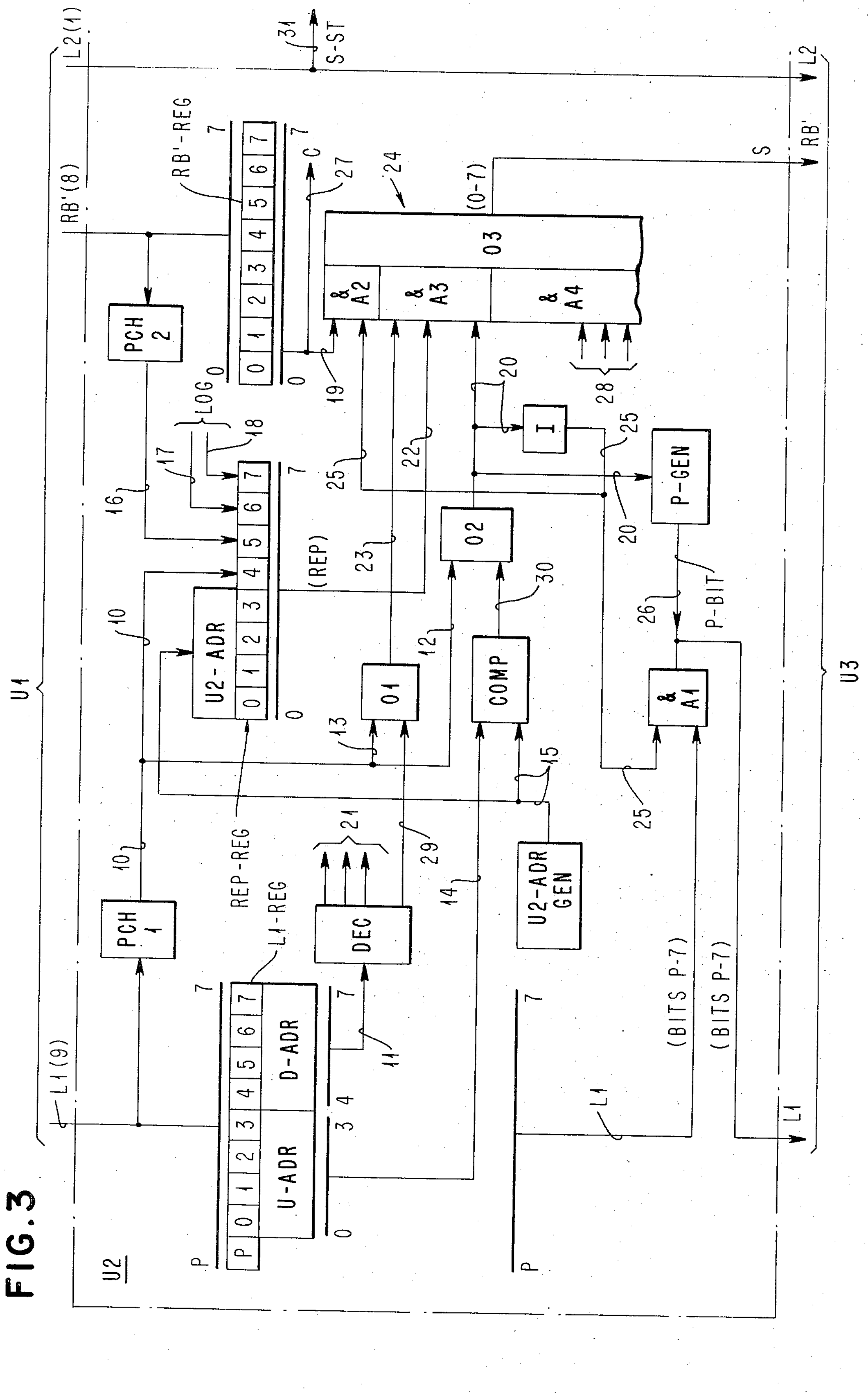
FIG. 3 is a block diagram of that part of the test arrangement which is provided in each processing module of the modular electronic data processing system.

For supervising the proper communication between the various processing modules U1 to Un, and between the latter and the superordinate control CU, special means are employed whose circuits are schematically represented in FIGS. 2 and 3. These means ensure that the following test functions are implemented:

A. Answer-back by the addressed processing module
   The addressed processing module responds to its selection by transferring its unit address back to the superordinate control CU, so detecting
   1. non-addressing,
   2. false addressing,
   3. multiple addressing.

B. Testing the data bus
   1. in a closed ring, and
   2. to each unit.

This permits testing the functions of the data transfer path which is also employed for error messages from the processing modules to the superordinate control.

C. Testing the address bus (L1; FIG. 2) During this test the processing module which is the first to detect a processing error automatically signals its previously assigned address to the superordinate control CU. In addition, this module sets off the address bus with the correct parity. This ensures that 1. in the case of an address bus error an answer-back will be made (because if the parity error on the address bus were to continue, it would no longer be possible to interrogate a processing module), and
2. the answer-back is only made from the processing module which was the first to detect the error in the bus system.

These functions are explained below in connection with the circuits in accordance with the invention. As is shown in FIGS. 1 and 2, bus RB (which beyond the last processing module U*n* merely continues as data bus RB') consists of address bus L1, data bus RB', and control bus L2. While address bus L1 and control bus L2 merely extend up to the last processing module Un, data bus RB' leads back to control unit CU from where it originally started. Bus RB begins in the transmitter part 1 and ends in the receiver part 2 of the control unit CU.

The parts of the control unit CU which are of interest here, the transmitter part 1 and the receiver part 2 are shown in detail in FIG. 2. It will be seen that from the last processing module Un only data bus RB' is designed as a ring bus. It will also be seen that the address bus L1 in each processing module Ui is connected to an address decoder ADR-DEC. As is shown in FIG. 2, data bus RB' permits bilateral communication, i.e., from the control unit CU to the processing modules for implementing control jobs C, and from the processing modules to the control unit for the transmission of sensed data which are generally referred to as S. The direction of information is determined by a signal of the controller C–ST, which is transmitted to the processing modules via control bus L2. This control signal is designated as S–ST in the processing module Un in FIG. 2.

Transmitter part 1 in control unit CU comprises a ring bus address register RB ADR-REG storing the address bits 0 to 7 and a parity bit P. These nine bits are transmitted to the processing modules Ui via address bus L1, selecting the processing module determined by the address bits. Transmitter part 1 comprises a further register which is associated with data bus RB'. This register, functioning as a data output register, is designated as RB' DO-REG and can accommodate eight data bits. As mentioned above, this register is associated with data bus RB' which, as a ring bus, leads back to control unit CU. The data transmitted via data bus RB' are entered into data input register RB' DI REG in the receiver part 2 of the control unit CU. Controller C-ST in the transmitter part 1 of CU is provided as an output with a control bus L2 which, as a chain bus, is linked with the various processing modules. Bilateral communication in the direction from the control unit to the processing modules and vice versa is controlled by the signal on the chain bus.

FIG. 3 is a more detailed representation of the control circuit provided in identical form in each processing module Ui for the various test jobs to be executed. FIG. 3 shows in particular the control circuit for processing module U2 which is located in the chain between processing module U1 and U3.

The address reaching processing module U2 from control unit CU is initially tested for valid parity in parity check PCH1 and is then intermediately stored in address register L1–REG and divided into a unit address U-ADR with the bits 0 to 3 and a more detailed address D-ADR with the bits 4 to 7.

In the event of this unit, i.e., processing module U2, being addressed or being found to contain an address bus error, it switches off the address bus with the correct parity via AND circuit A1, the termination address pattern and the correct parity bit being generated by circuit P-GEN. This ensures that only the selected processing module U2 answers back to control unit CU, which is of great importance to the determination of the error location.

To determine whether it has been addressed, processing module U2 compares the unit or processing module address U-ADR with the unit address generated by its address generator U2–ADR–GEN, utilizing compare circuit COMP. If COMP determines that the addresses on its two inputs are equal it generates an output signal on its output line 30, which is transmitted to inverter I via OR gate 02 and line 20. Via line 25 the output signal of this inverter blocks the AND gate A1 which is used as a switch to transmit the address information to the next processing module. Thus, address bus L1 is blocked in the direction of the next processing module U3. A signal corresponding to a binary zero is in this case carried by the eight output lines of A1. Pattern generator P-GEN which, via line 20, is also controlled by the output signal of the OR gate 02 generates this output information with the correct parity bit. If the parity is odd this bit corresponds to a binary 1. Difficulties arising from the signal polarity when other systems or technologies have to be adapted to can be overcome by replacing high-level signals by low-level ones and vice versa.

Even if a parity error on address bus L1 is detected by parity check circuit PCH1, the address bus L1 with the correct parity is switched off. In the case of an address error on Line 1 parity check circuit PCH1 emits an output signal which is transmitted to OR gate 02 via lines 10 and 12. As has been previously described in connection with the selection of a processing module, the output signal of this OR gate leads to AND gate A1 to be blocked.

As has been previously stated, the answer-back of the addressed unit or the unit which was the first to detect the parity error on address line L1 is effected via data bus RB'. To ensure, however, that this transmission path is failsafe, the various processing modules are successively tested by control unit CU with respect to several criteria. These tests are initiated by control unit CU by applying an address to address line L1 which is not associated with any of the system processing modules. As this invalid address (which may be, for example, the address 0 with the correct parity) is applied to address bus L1, it is possible for parity errors in the respective parity check cicuits PCHi to be detected at this stage. This will be considered later on.

Subsequently, the following data patterns are successively made available in the data output register RB'-DO REG (FIG. 2) of the data bus in control unit CU:

1. 0101 0100
2. 1010 1011
3. 1101 0101

The control unit initially transmits the first data pattern to data bus RB'. As it has been assumed that there is no address error present, this data pattern is transmitted by the first processing module U1, via data bus RB', to processing module U2. As is shown in FIG. 3, this data pattern is stored in register RB'-REG which on the input side is linked with the data bus RB'. The output of this register is connected to lines 19 and 27. In the control phase, defined by signals S–ST on control bus L2, line 27 supplies control information C to processing module U2. The bit pattern stored in RB'-REG is transmitted to AND gate A2 via the 8-bit wide line 19. AND gate A2 forms part of a more complex gate structure 24 which consists of a number of AND gates, such as, A2, A3, A4 . . . whose outputs are linked with the inputs of the connected OR gate 03. In this case the 8-bit wide output of this OR gate 03 represents the extension of the data bus RB' via which the sensed data are transmitted during the sensing phase which is also defined by control signals S-ST on control line L2.

As processing module U2 is not selected either, a signal corresponding to a binary 0 is applied to output 30 of the compare circuit COMP. Via OR gate 02 and line 20 this signal is transmitted to inverter I which provides a signal corresponding to a binary 1 on its output line 25. This signal opens the AND gate A2, so that the first test pattern which was applied by control unit CU to the data bus is transmitted to a further subsection of the data bus RB' up to the next processing module U3 via line 19, AND gate A2, and OR gate 03. For the three test patterns described, these processes or steps are repeated one after the other in the various processing modules U1 to Un connected to the system. Before being used for further test patterns, commands, and results, data bus RB' can thus be tested for "open," "earthed," and shunted lines.

After data bus RB' has been tested, the individual processing modules are successively addressed by control unit CU while the modules U1 to Un are further tested. To this end the address consisting of the two parts U–ADR and D–ADR is transmitted from control unit CU via address bus L1. As has been previously mentioned, the module address is in the U–ADR part. In the D–ADR address part the individual bits represent certain orders or instructions which are decoded in a decoder DEC and are implemented by the respective processing module.

For the selection of processing module U2 by control unit CU the equivalent AND gate A1 in processing module U1 is opened, so passing the address to processing module U2 via line L1. The selected processing module separates address bus L1 in the direction of the other processing modules U3 to Un with the correct parity. At intervals, the three test patterns are transmitted on data bus RB', testing the connected lines in the processing module in the same manner as has been described in connection with the data bus RB'. In addition, the parity bit is computed in parity circuit PCH2 for each of the test patterns and is entered, via line 16, into bit position 5 of the REP-REG register in which the reply byte REP is assembled. The parity bits for the three test patterns are computed one after the other. After a reply byte has been assembled for the first test pattern, for example, it is transmitted via data bus RB' to control unit CU where it is analyzed. Subsequently, the second reply byte is assembled and transmitted on the basis of the second test pattern and eventually the third reply byte on the basis of the third test pattern, the data bus being tested with the respective test pattern in between transmissions, without addressing any of the modules. After the reply byte of a processing module has been transmitted, control unit CU addresses the next processing module, for example, U3, subjecting it to the same tests as described. This process is continued until all processing modules have been tested by means of the various test patterns.

The reply byte REP assembled in REP-REG comprises the bits in positions 0 to 7, the first four bits indicating the four-position binary address of the respective processing module. Via line 10 a bit is entered into bit position 4 if the parity check circuit PCH1, testing the parity of the address on address bus L1, detects a parity error. The respective parity bit of the parity circuit PCH2 for one test pattern is entered into bit position 5. Bit positions 6 and 7 are fed by the logical circuit of the processing module via lines 17 and 18 to indicate, for example, a module error or a module request. The reply byte REP is transmitted to AND gate A3 via line 22 and to data bus RB' via OR gate 03 when decoder DEC, decoding the partial address D-ADR, or parity check circuit PCH1 generates an output signal corresponding to the binary 1. In addition, the corresponding unit must have been selected for transmitting the reply byte REP, so that the output signal of the compare circuit COMP, via line 30, and the OR gate 02, via line, fulfil the coincidence criterion for the AND gate A3 on its input. In the event of the parity check circuit PCH1 detecting a parity error in the address, even if the unit has not been addressed, the third coincidence criterion still missing is transmitted to the input of the AND gate A3 via line 12, OR gate 02, and line 20. Thus, the control unit CU is signalled by the reply byte REP that the respective processing module was the first to detect a system address error.

In the case of address errors the respective unit automatically signals its unit address and the respective bit for address error messages, the bit concerned having the position number 4 in the REP-REG register. Automatic answer-back is necessary since in the event of an address error the control unit is prevented from contacting the various units.

In the sensing phase which is defined by the signals S-ST on the control bus and their branch in the corresponding processing module other data of interest to the control unit can be transmitted via lines 28 and further AND gates A4, etc., as well as via data bus RB'.

For a more economic but slower version of the test arrangement of FIG. 3, which is provided in each processing module, address bus register L1–REG, test reply information register REP-REG, and data bus register RB'-REG could be replaced by an AND gate complex (not shown). This is possible since the corresponding information has been previously stored in one form or another elsewhere in the data processing system. Thus, for example, the address information in the control unit CU in FIG. 2 is also stored in register RB ADR-REG and the test data pattern in a static form is available in register RB' DO-REG.

The individual bits 0 to 7 of the test reply REP are also available in a static form. The unit address, for example, U2–ADR, is applied to line 15 on the output of the unit address generator U2–ADR–GEN. Thus, bits 0 to 3 of the test reply REP are stored in a static form. Similarly, the output signal of the parity check circuit PCH1, which forms bit 4, is available in a stored form. The same applies to the output signal of the parity circuit PCH2 which supplies bit 5 of the test reply REP. Finally, bits 6 and 7 are available in a stored form in the logical circuit of the processing unit.

The AND gate complex would serve to transmit the indicated signals at a particular point in time which is defined by the control signal S-ST, for example. Transmission is effected independent of the respective function from the control unit CU to the processing modules U*i* or from the processing modules to the control unit.

The speed loss of the latter version of the test arrangement in accordance with the invention is caused by the control unit CU, for example, being compelled to store a particular unit address in register RB ADR-REG in FIG. 2 until the communication with a particular processing module has come to an end.

In accordance with another embodiment, the address bus register in the control unit could be newly loaded immediately after an address information has been transmitted to a particular processing module and after this address has been stored in the address bus register L1–REG.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. For use in each of a plurality of units within a modular data processing system wherein individual processing units are linked with each other via a bus system and with a central control, said bus system carrying address, data, and control information, apparatus for error testing and error localization comprising:

address indicating means indicating the unit address;

comparison means for comparing said unit address to an address received from said central control;

pattern generating means for terminating said address bus with a given bit pattern;

error checking means for signalling errors in address information received via said bus system;

test reply storage means for temporarily storing said unit address and the output of said error checking means prior to transmission; and control means for controlling transmission of said given bit pattern and the contents of said test reply storage means.

2. The apparatus of claim 1 further including means responsive to an error signal from said error checking means to cause transmission of the contents of said test reply storage means irrespective of whether or not its particular processing unit has been addressed.

3. The apparatus of claim 1 wherein said bus system comprises:

a data ring bus going serially from said central control to said individual processing units and back to said central control; and address and control chain buses leading serially from said central control to said individual processing units, and terminating at the last of said units.

4. The apparatus of claim 3 further including means responsive to first control signals received over said control bus for placing its respective processing unit in a receive control phase during which control data are transmitted from said central control via said data bus to said processing units; and means responsive to second control signals received over said control bus for placing said respective processing unit in a transmit phase during which sensed data are transmitted from said processing units to said central control.

5. The apparatus of claim 3 further including:

means responsive to an error signal from said error checking means to cause transmission of the contents of said test reply storage means irrespective of whether or not its particular processing unit has been addressed.

6. The apparatus of claim 5 further including:

means responsive to first control signals received over said control bus for placing its respective processing unit in a receive control phase during which control data are transmitted from said central control via said data bus to said processing units; and means responsive to second control signals received over said control bus for placing said respective processing unit in a transmit phase during which sensed data are transmitted from said processing units to said central control.

7. The apparatus of claim 6 further including address register means for storing the address received from said central control.

8. The apparatus of claim 7 wherein said address register means is subdivided into a first part for storing unit addresses and a second part for storing control command information.

9. The apparatus of claim 8 further including:

decoding means for decoding control command information stored in said second part of said address register means;

said decoding means causing transmission of the contents of said test reply storage means to said central control after said comparison means produces an equal compare signal.

10. In a modular data processing system wherein a plurality of individual processing units are linked with each other via a bus system and with a central control, said bus system carrying address, data, and control information, a method for testing said system comprising the steps of:

transmitting to a first one of the processing units an address, with correct parity, which is not the address of any of the processing units;

in all but a last one of the processing units, checking the parity of the received address and then transmitting the address to a next processing unit;

in the last processing unit, checking the parity of the received address;

transmitting a predetermined test pattern to the processing units;

generating, in each processing unit, the parity of the received test pattern;

transmitting, from each processing unit to the central control, the generated parity and the address of the respective processing unit; and analyzing in the central control, the tranmissions received from the processing units;

whereby the bus system linking the individual processing units to each other and to the central control is tested.

11. The testing method of claim 10 including, in the event that one of the processing units detects an address parity error, the additional steps of:

generating a signal which indicates that a parity error was detected; and transmitting the generated signal to the central control.

12. The testing method of claim 11 including the additional step of:

blocking the address received by the processing unit which detected a parity error from being transmitted to other processing units.

13. The testing method of claim 12 including the additional steps of:

generating, within the processing unit which detected a parity error, a predetermined address pattern; and transmitting the pattern to the next processing unit.

* * * * *